(12) United States Patent
Kinch et al.

(10) Patent No.: US 9,114,790 B2
(45) Date of Patent: Aug. 25, 2015

(54) SHIFT-BY-WIRE ACTUATION OF A TRANSMISSION PARK BRAKE

(71) Applicant: FORD GLOBAL TECHNOLOGIES, LLC, Dearborn, MI (US)

(72) Inventors: Derek Kinch, Ypsilanti, MI (US); Steven A. Frait, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 301 days.

(21) Appl. No.: 13/848,143

(22) Filed: Mar. 21, 2013

(65) Prior Publication Data

US 2014/0284170 A1   Sep. 25, 2014

(51) Int. Cl.
| | | |
|---|---|---|
| B60T 11/10 | (2006.01) | |
| F16D 63/00 | (2006.01) | |
| B60T 1/00 | (2006.01) | |
| B60T 1/06 | (2006.01) | |
| F16D 121/04 | (2012.01) | |
| F16D 121/20 | (2012.01) | |
| F16D 125/66 | (2012.01) | |

(52) U.S. Cl.
CPC ................. B60T 11/10 (2013.01); B60T 1/005 (2013.01); B60T 1/062 (2013.01); F16D 63/006 (2013.01); F16D 2121/04 (2013.01); F16D 2121/20 (2013.01); F16D 2125/66 (2013.01)

(58) Field of Classification Search
CPC .............. F16D 63/006; F16D 2125/66; F16D 2121/04; F16D 2121/20; B60T 11/10; B60T 11/101; B60T 11/102; B60T 11/103; B60T 11/105; B60T 11/224; B60T 11/28; B60T 1/005; B60T 1/062
See application file for complete search history.

(56) References Cited

U.S. PATENT DOCUMENTS

| | | |
|---|---|---|
| 3,557,913 A | 1/1971 | Russler |
| 3,893,549 A | 7/1975 | Bennett |
| 5,203,616 A | 4/1993 | Johnson |
| 5,458,402 A | 10/1995 | Jeffery |
| 5,695,030 A | 12/1997 | Medcalf, Jr. |
| 5,904,228 A | 5/1999 | Eike et al. |
| 6,701,797 B2 | 3/2004 | Heuver |
| 6,880,419 B2 | 4/2005 | Berger et al. |
| 6,983,668 B2 | 1/2006 | Powell et al. |
| 7,082,851 B2 | 8/2006 | Whitmarsh et al. |
| 7,490,528 B2 | 2/2009 | Koski et al. |
| 7,862,471 B2 | 1/2011 | Koski et al. |
| 7,896,775 B2 | 3/2011 | Vernacchia et al. |
| 7,954,394 B2 | 6/2011 | Yoshioka et al. |
| 8,012,063 B2 | 9/2011 | Powell et al. |
| 2013/0319155 A1* | 12/2013 | Berger .................. 74/473.11 |
| 2014/0144733 A1* | 5/2014 | Frait .................... 188/106 R |

* cited by examiner

*Primary Examiner* — Jacob S Scott
(74) *Attorney, Agent, or Firm* — James Dottavio; MacMillan, Sobanski & Todd, LLC

(57) ABSTRACT

A transmission park-brake system includes a transmission park brake, a solenoid, first, second and third pressure sources, and a servo valve for disengaging the park-brake using the first and second pressure sources, holding the park-brake disengaged using a force produced by the solenoid and one of the first and second pressure sources, and engaging the park-brake using the third pressure source.

14 Claims, 1 Drawing Sheet

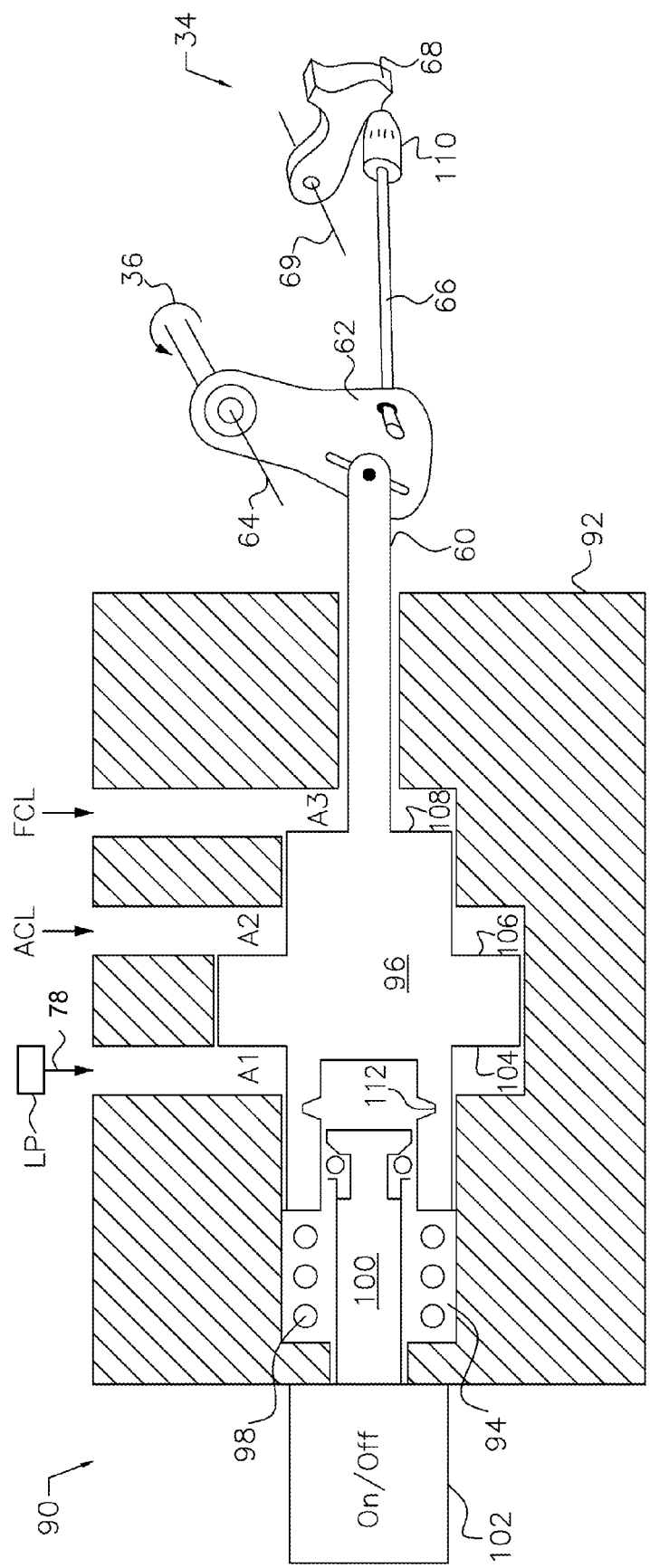

SHIFT-BY-WIRE ACTUATION OF A TRANSMISSION PARK BRAKE

BACKGROUND OF THE INVENTION

1. Field of the Invention

This invention relates generally to an apparatus for engaging and disengaging a transmission park brake through hydraulic and electrical actuation rather than by mechanical actuation by the vehicle operator.

2. Description of the Prior Art

In an automatic transmission that employs a shift-by-wire (SBW) control Park, Reverse, Neutral and Drive ranges of the transmission are engaged and disengaged under electrical control. SWB systems have begun to replace the conventional shifter cable, which is used in automatic transmissions to control the park pawl and a hydraulic manual valve that feeds pressure to clutches that distinguishes the Neutral range from the Reverse and Drive ranges.

SBW systems generally are of two types: (i) electromechanical having redundant hardware and supplemental power, and (ii) electro-hydraulic having a redundant electromechanical path. Electro-hydraulic SBW systems allow for reduced cost, but generally do not cover unintended loss of the Park function with single point failures.

SUMMARY OF THE INVENTION

A transmission park-brake system includes a transmission park brake, a solenoid, first, second and third pressure sources, and a servo valve for disengaging the park-brake using the first and second pressure sources, holding the park-brake disengaged using a force produced by the solenoid and one of the first and second pressure sources, and engaging the park-brake using the third pressure source.

A method for operating the park-brake system includes disengaging the park-brake using first and second pressure sources, holding the park-brake disengaged using a force produced by a solenoid and one of the first and second pressure sources, and engaging the park-brake using a third pressure source.

The system does not permit loss of park-engagement due to a single point failure. Using a latch valve from one of the transmission clutches, allows park-engagement, if an error state occurs. The system has a decoupling feature that allows for park-engagement, if the electro-mechanical solenoid fails in the latch position.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

The Figure is a cross sectional side view of a park servo for a shift-by-wire system that controls the selection of drive ranges of an automatic transmission.

DESCRIPTION OF THE PREFERRED EMBODIMENT

FIG. 1 is a schematic diagram of a park servo valve 90. Valve 90 includes a body 92 formed with a cylinder 94 containing a valve spool 96, helically coiled compression spring 98 and the actuator 100 of an on/off, electro-mechanical latch solenoid 102. Spool 96 is formed with a first surface 104 having an area A1, a second surface 106 having an area A2, and a third surface 108 having an area A3. Spool 96 is connected by a rod 60, which is secured to crank arm 62. A park rod 66 is connected to crank arm 62 and to the bullet 110, which contacts pawl 68, which pivots about axis 69 into and out of engagement with a park gear, which is secured to the driven output of a vehicle transmission or is driveably connected to the vehicle wheels.

Crank arm 62 pivots about axis 64. A torsional spring 36 applies torque to the crank arm 62.

The actuator 100 of solenoid 102 is releaseably latched to spool 96 at a detent recess 112 and can be delatched when the solenoid is activated to move leftward to the position shown in FIG. 1, or can be delatched if force generated on area A1 in conjunction with spring 98 overcomes the holding force of detent 112 and areas A2 and A3 have low pressure acting on them.

Hydraulic line 78 supplies hydraulic fluid at line pressure LP to area A1 of surface 104 of spool 96.

Actuating pressure ACL is supplied by the transmission's hydraulic system to a servo of a first clutch and to area A2. The first clutch is actuated to engage when ACL pressure is relative high and one of the lower forward gears or reverse gear is to be produced. For example, in a transmission that produces ten forward gears, the first clutch is engaged during operation in reverse gear and the first, second, third, fourth, fifth and sixth forward gears.

Similarly, actuating pressure FCL is supplied by the transmission's hydraulic system to a servo of a second clutch and to area A3. The second clutch is actuated to engage when FCL pressure is relative high and one of the higher gears or reverse gear is to be produced. For example, in a transmission that produces ten forward gears, the second clutch is engaged during operation in reverse gear and the fourth, fifth, sixth, seventh, eighth, ninth and tenth forward gears.

In operation, spool 96 is displaced leftward in cylinder 94 causing the bullet 110 to be moved away from the Park-engaged position and the actuator 100 of solenoid 102 to latch onto detent recess 112 of spool 96 due to the forces produced by pressures ACL and FCL on areas A2 and A3, respectively. Counteracting the forces produced by pressures ACL and FCL on areas A2 and A3 are the force due to line pressure acting on area A1, the force of spring 98 and the force required to move bullet 110 out of engagement with pawl 68.

When the first clutch is engaged and the second clutch is disengaged, spool 96 and bullet 110 are held leftward in the Park-disengaged positions due to the forces produced by pressure ACL on area A2 and the holding force produced by solenoid 102. Counteracting these forces are the force of spring 98 and the force produced by line pressure on area A1. Alternatively, when the second clutch is engaged and the first clutch is disengaged, spool 96 and bullet 110 are held leftward in their Park-disengaged positions due to the forces produced by pressure FCL on area A3 and the holding force produced by solenoid 102. Counteracting these forces are the force of spring 98 and the force produced by line pressure on area A1.

The park system 34 is held in the leftward, Park-disengaged position during an automatically produced engine stop-engine restart cycle by the holding force produced by solenoid 102 acting against the rightward force of spring 98.

The system 34 is returned to the Park-engaged position by displacing spool 96 rightward causing bullet 110 to engage the park pawl 68 and to pivot the pawl to the Park-engaged position and into engagement with the park gear. Spool 96 and bullet 110 move rightward in response to the rightward force produced by line pressure LP acting on area A1 and the rightward force of spring 98 acting against the leftward force of resistance required to reengage bullet 110 with park pawl 68 and the holding force produced by solenoid 102, if solenoid 102 is not functioning or power is lost to control solenoid 102. With normal function of the solenoid 102, the solenoid will open, thereby having zero holding force.

In the event of a loss of vehicle electric power onboard the vehicle, system 34 is returned to the Park-engaged position by displacing spool 96 rightward causing bullet 110 to engage the park pawl 68 and to pivot the pawl to the Park-engaged position and into engagement with the park gear in response to the rightward force produced by line pressure LP acting on area A1 acting against the leftward force of resistance required to reengage bullet 110 with park pawl 68 and overcoming the holding force produced by solenoid 102.

In the event of an loss of hydraulic pressure, system 34 his returned to the Park-engaged position by displacing spool 96 rightward causing bullet 110 to engage the park pawl 68 and to pivot the pawl to the Park-engaged position and into engagement with the park gear in response to the rightward force of spring 98 acting against the leftward force of resistance required to reengage bullet 110 with park pawl 68.

Alternatively, system 34 and valve 90 may be rearranged such that a compression force pushes bullet 110 away from engagement with pawl 68 causing the system to be pushed out of Park rather than being pulled out of Park by a tension force.

Alternatively a Park-holdout pressure area may be added to valve 90 and a Park-holdout pressure may be applied to that area such that more than two pressures or line pressure LP hold system 34 out of Park than just the two pressures ACL and FCL that pull out of Park.

Park holdout pressure may be routed through the park actuator valve 90, thereby eliminating need for additional hardware to holdout of Park using more than only two pressures ACL and FCL.

In accordance with the provisions of the patent statutes, the preferred embodiment has been described. However, it should be noted that the alternate embodiments can be practiced otherwise than as specifically illustrated and described.

The invention claimed is:

1. A transmission park-brake system, comprising:
   a transmission park brake;
   a solenoid;
   first, second and third pressure sources;
   a servo valve for disengaging the park-brake using the first and second pressure sources, holding the park-brake disengaged using a force produced by the solenoid and one of the first and second pressure sources, and engaging the park-brake using the third pressure source.

2. The transmission park-brake system of claim 1, wherein:
   the servo valve includes a first surface having a first area to which pressure of the first pressure source is applied to the servo valve when a first control element of a transmission is engaged; and
   the servo valve includes a second surface having a second area to which pressure of the second pressure source is applied to the servo valve when a second control element of the transmission is engaged.

3. The transmission park-brake system of claim 2, wherein:
   the servo valve includes a third surface having a third area to which pressure of the third pressure source is applied to the servo valve tending to engage the park brake.

4. The transmission park-brake system of claim 1, wherein:
   the servo valve includes a first surface having a first area to which pressure of the first pressure source is applied to the servo valve tending to disengage the transmission park brake when a first control element of a transmission is engaged to produce alternately reverse gear and one of a first set of forward gears of the transmission; and
   the servo valve includes a second surface having a second area to which pressure of the second pressure source is applied to the servo valve tending to disengage the transmission park brake when a second control element of the transmission is engaged to produce alternately reverse gear and one of a second set of forward gears of the transmission.

5. The transmission park-brake system of claim 1, wherein the solenoid applies a force to the servo valve tending to resist engagement of the transmission park brake.

6. The transmission park-brake system of claim 1, wherein the servo valve includes a spring that applies a force to the servo valve tending to engage the transmission park brake.

7. A transmission park-brake system, comprising:
   a transmission park brake;
   a solenoid;
   first, second and third pressure sources;
   a servo valve including a spool alternately releaseably latchable to the solenoid, connected to the park-brake, and formed with a surface to which pressure of the first pressure source is applicable, a second surface to which pressure of the second pressure source is applicable, and a third surface to which pressure of the third pressure source is applicable.

8. The transmission park-brake system of claim 7, wherein:
   pressure of the first pressure source is applied to the surface when a first control element of a transmission is engaged;
   pressure of the second pressure source is applied to the second surface when a second control element of the transmission is engaged; and
   pressure of the third pressure source is applied to the third surface when the transmission is driven by a power source.

9. The transmission park-brake system of claim 7, wherein:
   pressure of the first pressure source when applied to the surface tends to disengage the transmission park brake;
   pressure of the second pressure source when applied to the second surface tends to disengage the transmission park brake; and
   pressure of the third pressure source when is applied to the third surface tends to engage the transmission park brake.

10. The transmission park-brake system of claim 7, further comprising a spring that applies a force to the spool tending to engage the transmission park brake.

11. The transmission park-brake system of claim 7, further comprising a spring that applies a force to the spool that engages the transmission park brake when pressure of the first, second and third pressure sources is absent.

12. A method for operating a transmission park-brake system, comprising:
   disengaging the transmission park-brake using first and second pressure sources;
   holding the transmission park-brake disengaged using a force produced by a solenoid and one of the first and second pressure sources; and
   engaging the transmission park-brake using a third pressure source.

13. The method of claim 12, further comprising using a force produced by a spring to engage the transmission park brake when pressure produced by the first, second and third pressure sources is absent.

14. The method of claim 12, further comprising using a force produced by a spring and using the third pressure source to engage the transmission park brake when pressure of the pressure produced by the first and second pressure sources is absent.

\* \* \* \* \*